(12) United States Patent
    Poston

(10) Patent No.: US 9,241,479 B2
(45) Date of Patent: Jan. 26, 2016

(54) BARBLESS WEIGHTED RELEASABLE FISH DESCENDING HOOK

(71) Applicant: Roy Leon Poston, St Johns., FL (US)

(72) Inventor: Roy Leon Poston, St Johns., FL (US)

( * ) Notice: Subject to any disclaimer, the term of this patent is extended or adjusted under 35 U.S.C. 154(b) by 0 days.

(21) Appl. No.: 14/488,502

(22) Filed: Sep. 17, 2014

(65) Prior Publication Data
    US 2015/0082685 A1    Mar. 26, 2015

Related U.S. Application Data

(60) Provisional application No. 61/880,589, filed on Sep. 20, 2013.

(51) Int. Cl.
    *A01K 97/00*    (2006.01)
    *A01K 83/06*    (2006.01)
    *A01K 83/00*    (2006.01)

(52) U.S. Cl.
    CPC .................. *A01K 83/00* (2013.01); *A01K 83/06* (2013.01); *A01K 97/00* (2013.01)

(58) Field of Classification Search
    CPC ...... A01K 97/00; A01K 83/06; Y10S 24/908; Y10T 24/3484; Y10T 34/392; Y10T 24/3922; F16B 45/00
    USPC .......... 43/4, 44.2, 44.4, 44.6, 44.8; 24/6, 356, 24/359, 360, 363, 368, 369, 377, 305, 706, 24/706.2, 709, 709.2, 709.4, 709.6, 709.7, 24/709.8, 710, 710.1, 710.2, 711.4
    See application file for complete search history.

(56) References Cited

U.S. PATENT DOCUMENTS

| | | | | | |
|---|---|---|---|---|---|
| 313,691 | A | * | 3/1885 | St. John | A44B 9/12 24/707.8 |
| 518,868 | A | * | 4/1894 | Stifel | A45F 5/08 24/6 |
| 551,581 | A | * | 12/1895 | Crane | A01K 83/06 43/44.8 |
| 580,915 | A | * | 4/1897 | Welch | 43/44.2 |
| 587,306 | A | * | 8/1897 | Greenfield | A44B 9/14 24/710.2 |
| 607,411 | A | * | 7/1898 | Hayden | A45F 5/08 24/6 |
| 657,704 | A | * | 9/1900 | Martin | A44B 9/14 24/709.7 |
| 794,352 | A | * | 7/1905 | Gebhardt | A01K 83/06 43/44.6 |
| 939,316 | A | * | 11/1909 | Ranum | B65D 33/1675 43/44.8 |
| 1,004,592 | A | * | 10/1911 | Rhodes | A44B 9/18 24/709.2 |

(Continued)

*Primary Examiner* — Darren W Ark
(74) *Attorney, Agent, or Firm* — Mark Young, P.A.

(57) ABSTRACT

An elongated barbless upside down hook, physically returns a fish back to the bottom, naturally recompressing the trapped air, oxygenating the fish on the way down and releasing it unharmed. The hook uses a weight attached at the end of the shank to descend the device and a retrieval line attached at the bend (bight) to withdraw the hook from the fish and bring the hook back to the surface. This device avoids any moving parts or triggers and is capable of returning any size fish or multiple fish at the same time.

20 Claims, 3 Drawing Sheets

(56) References Cited

U.S. PATENT DOCUMENTS

| | | | | |
|---|---|---|---|---|
| 1,246,150 A | * | 11/1917 | Parr | 43/44.4 |
| 1,299,675 A | * | 4/1919 | Parr | A44B 9/14 24/710.2 |
| 1,325,530 A | * | 12/1919 | Ore | A01K 83/00 43/44.2 |
| 1,372,820 A | * | 3/1921 | Kern | A45F 5/08 24/6 |
| 1,425,480 A | * | 8/1922 | Hoffmann | A45F 5/08 24/6 |
| 1,553,256 A | * | 9/1925 | Miller | A44B 9/18 24/709.7 |
| 1,778,246 A | * | 10/1930 | Deans | A45F 5/08 24/6 |
| 1,791,723 A | * | 2/1931 | Hampton | 43/44.8 |
| 1,797,523 A | * | 3/1931 | Dippel | A44B 9/18 24/709.7 |
| 1,863,544 A | * | 6/1932 | Prouse | 43/44.8 |
| 1,879,161 A | * | 9/1932 | Frambach et al. | 43/53.5 |
| 1,949,331 A | * | 2/1934 | Richardson | A41F 15/02 24/363 |
| 2,015,149 A | * | 9/1935 | Krzeminski | A41H 31/00 24/709.8 |
| 2,104,880 A | * | 1/1938 | Lintner | A44B 9/14 24/710.1 |
| 2,106,438 A | * | 1/1938 | Schwartz | A47H 13/04 24/363 |
| 2,148,074 A | * | 2/1939 | Kaspick | 43/44.8 |
| 2,176,537 A | * | 10/1939 | Miener | A41D 25/10 24/377 |
| 2,190,893 A | * | 2/1940 | Symons | A44B 9/06 24/706 |
| 2,273,368 A | * | 2/1942 | Mumford | A45F 5/08 24/709.8 |
| 2,276,377 A | * | 3/1942 | Duffek | D06F 55/00 24/369 |
| 2,476,126 A | * | 7/1949 | Weiss | A01K 83/06 43/44.2 |
| 2,613,412 A | * | 10/1952 | Robinson | A44B 9/00 24/6 |
| 2,653,048 A | * | 9/1953 | Novak | 43/4 |
| 2,755,593 A | * | 7/1956 | Thurman | A01K 83/06 43/44.2 |
| 2,784,469 A | * | 3/1957 | Ponciano | A44B 9/12 24/6 |
| 2,797,522 A | * | 7/1957 | Friedrich | A01K 83/06 43/44.8 |
| 2,825,174 A | * | 3/1958 | Leinonen | A01K 83/06 43/44.8 |
| 2,871,611 A | * | 2/1959 | Shepard, Jr. | 43/44.2 |
| 2,876,520 A | * | 3/1959 | Sporkland | A44B 9/12 24/709.1 |
| 2,903,773 A | * | 9/1959 | Piplack | A44B 9/18 24/710.2 |
| 2,938,296 A | * | 5/1960 | Kracht | 43/44.8 |
| 2,971,235 A | * | 2/1961 | Benoit | A44B 9/14 24/710 |
| 2,977,710 A | * | 4/1961 | Stambaugh | A01K 83/06 43/44.2 |
| 2,988,395 A | * | 6/1961 | Rogers | B64D 17/383 43/43.12 |
| 3,001,259 A | * | 9/1961 | Scheemaeker | A44B 9/12 24/710 |
| 3,570,070 A | * | 3/1971 | Rose | A44B 9/00 24/6 |
| 3,583,040 A | * | 6/1971 | Terrell et al. | A44B 9/12 24/710 |
| 3,834,060 A | * | 9/1974 | Wagenknecht | A01K 83/06 43/44.8 |
| 3,839,814 A | * | 10/1974 | Sykora | 43/44.2 |
| 4,023,303 A | * | 5/1977 | Maunu | 43/53.5 |
| 4,422,260 A | * | 12/1983 | Perrick | A01K 83/06 43/44.2 |
| 4,646,464 A | * | 3/1987 | Wyatt | 43/44.8 |
| 4,989,361 A | * | 2/1991 | Peterson | 43/44.2 |
| 5,218,780 A | * | 6/1993 | Jacobson | 43/44.8 |
| 5,386,661 A | * | 2/1995 | Davis | 43/44.8 |
| 5,548,920 A | * | 8/1996 | Peddycoart | A01K 85/10 43/44.2 |
| 6,141,900 A | * | 11/2000 | Rudolph | 43/44.8 |
| 6,389,649 B1 | * | 5/2002 | Metzler | A45F 5/08 24/6 |
| 6,421,949 B1 | * | 7/2002 | Schytte | A01K 91/06 43/43.12 |
| D534,237 S | * | 12/2006 | Shelton | D22/144 |
| 7,469,497 B2 | * | 12/2008 | Hergott | A01K 85/00 43/44.2 |
| 7,481,018 B1 | * | 1/2009 | Adams | 43/44.8 |
| 7,676,982 B1 | * | 3/2010 | Lee | 43/4 |
| 7,735,257 B1 | * | 6/2010 | Firmin | 43/44.8 |
| 7,856,751 B1 | * | 12/2010 | Moncrief | 43/4 |
| 7,874,096 B2 | * | 1/2011 | Callaway | A01K 97/00 43/4 |
| 7,934,336 B2 | * | 5/2011 | Cooksey et al. | 43/4 |
| 8,167,251 B2 | * | 5/2012 | Murphy et al. | 24/908 |
| 8,347,806 B2 | * | 1/2013 | Griffin | 24/131 R |
| 8,806,800 B2 | * | 8/2014 | Hupp et al. | 43/4 |
| 2003/0182843 A1 | * | 10/2003 | Smart et al. | 43/44.2 |
| 2008/0110077 A1 | * | 5/2008 | Callaway | 43/4.5 |
| 2009/0149836 A1 | * | 6/2009 | Teachout | A61D 1/14 119/200 |
| 2010/0005698 A1 | * | 1/2010 | Raus | 43/4 |
| 2012/0260556 A1 | * | 10/2012 | Hupp | 43/4 |
| 2015/0027030 A1 | * | 1/2015 | Huebner | 43/4 |
| 2015/0164058 A1 | * | 6/2015 | Parks | A01K 97/00 43/43.1 |
| 2015/0189863 A1 | * | 7/2015 | Stanaland | A01K 83/06 43/44.2 |

* cited by examiner

BARBLESS WEIGHTED RELEASABLE FISH DESCENDING HOOK

RELATED APPLICATION

This application is a nonprovisional of and claims the benefit of priority of U.S. Provisional Application 61/880,589, filed Sep. 20, 2013, the entire contents of which are incorporated herein by this reference and made a part hereof.

FIELD OF THE INVENTION

This invention relates generally to fish descending, and, more particularly, to a barbless weighted releasable hook for returning deep water fish.

BACKGROUND

Fishermen often catch fish that are too small, out of season, not editable or they just do not want to keep. When these fish are reeled up from depth, the changes in pressure cause the internal organs and swim bladder to expand and the fish can not return back to its habitat if released. It will become a "floater" and die. This bloating condition is referred to as barotrauma.

There are currently several methods of treating barotrauma and returning fish to their habitat. One device is a venting tool that requires inserting a hollow needle into the fish's side, hitting the swim bladder to release the trapped air. The fish is then thrown back into the water to swim back to the bottom on its own. Venting is not always successful and incorrect venting can injure the fish causing it to die. There are several other devices that clamp on to the fish's mouth. These devices require a jerk on the line or the device has to hit the bottom to activate a release mechanism and free the fish. These devices can only return a single fish at a time. They depend upon a relatively complex clamping and release mechanism, which is not only costly to manufacture, but cumbersome to operate and somewhat unreliable, especially after repeated use.

The invention is directed to overcoming one or more of the problems and solving one or more of the needs as set forth above.

SUMMARY OF THE INVENTION

To solve one or more of the problems set forth above, in an exemplary implementation of the invention, an upside down weighted barbless hook takes fish back to the bottom where it is released unharmed. A hook according to principles of the invention does not require venting of the fish nor any triggering of a mechanism by jerking or hitting on the hard bottom to release the fish. Problems associated with use and manufacture of complex moving parts are avoided. A hook according to principles of the invention can release the fish at any desired depth by simply stopping the retrieval line that is attached to the device, and the fish will slide off the device. Such a hook is capable of returning any size fish and/or multiple fish at the same time.

An upside down weighted barbless hook according to principles of the invention returns fish to their natural habitat and releasing them unharmed. An exemplary upside down barbless hook is comprised of a "U" shaped piece of metal round stock with one end of the "U" sharpened to a point. Rings are either welded on or bent into the device during manufacturing. The rings are for attaching a retrieval line to bring the device back and for attaching various sizes of weights to carry the fish to the bottom.

More specifically, an upside down descending hook according to principles of the invention includes a tip (e.g., a barbless tip which may be sharpened and/or pointed), an elongated neck extending from the tip to a bend, an elongated shank having a first end and an opposite second end, the first end of the shank leading from either the bend or from a line retrieval ring integrally formed at the bend, a weight attaching ring attached to the second end of the shank, and a line retrieval ring attached to the bend. The weight attaching ring and the line retrieval ring may each be welded onto the hook or integrally formed by bending stock. The shank is preferably longer than the neck. The neck and shank are preferably substantially parallel, though divergent and convergent arrangements are possible and within the scope of the invention. The hook is preferably made of metal, and more preferably a corrosion resistant metal. In the case of rings formed by bending, the rings may be welded (e.g., tack welded) closed to prevent a weight or line from slipping off.

After a retrival line has been attached to the appropriate ring, the sharpened end of the device is inserted up through the thin skin under the fish's mouth, and out its mouth, being careful to avoid the stomach if it is protruding. An appropriate sized weight (sinker) is attached to the ring for the weight. The weight should have sufficient mass to carry the fish to the bottom. Holding the device by the weight with the fish in the bottom of the "U", the device and fish are tossed into the water. In the water, the device will turn upside down under the influence of the wieght, head for the bottom, causing the fish's mouth to open and forcing water through the gills which oxygenates the fish. When the device is stopped, the fish will slide off and swim away. In this manner, an upside down weighted barbless hook according to principles of the invention substantially increases a returned fish's chance of survival.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
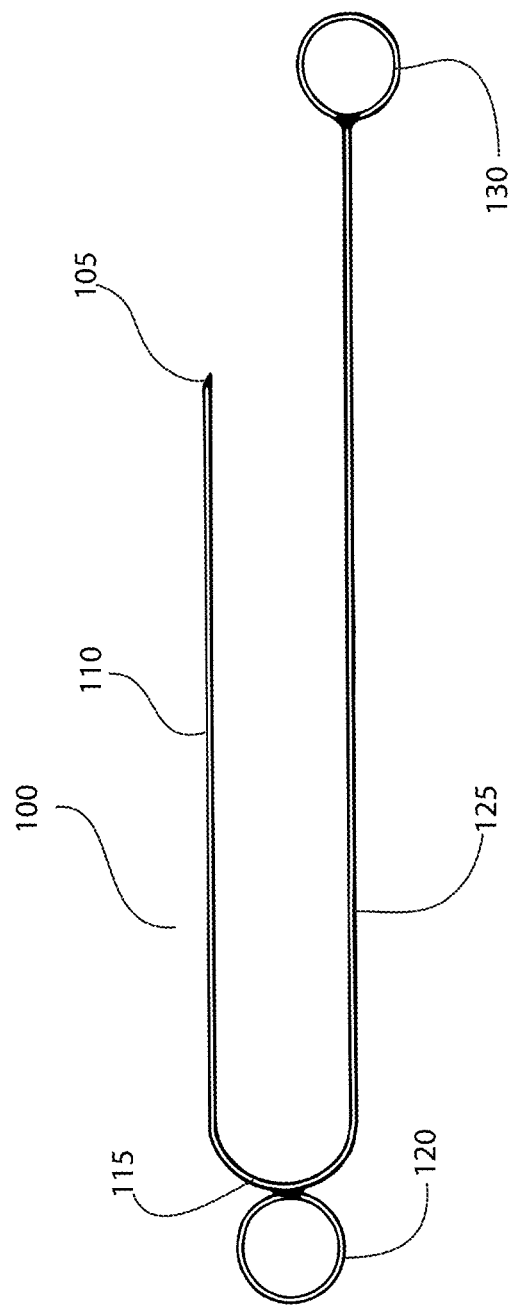
FIG. 1 conceptually illustrates an exemplary upside down weighted barbless hook with welded rings according to principles of the invention.
Figure 2:
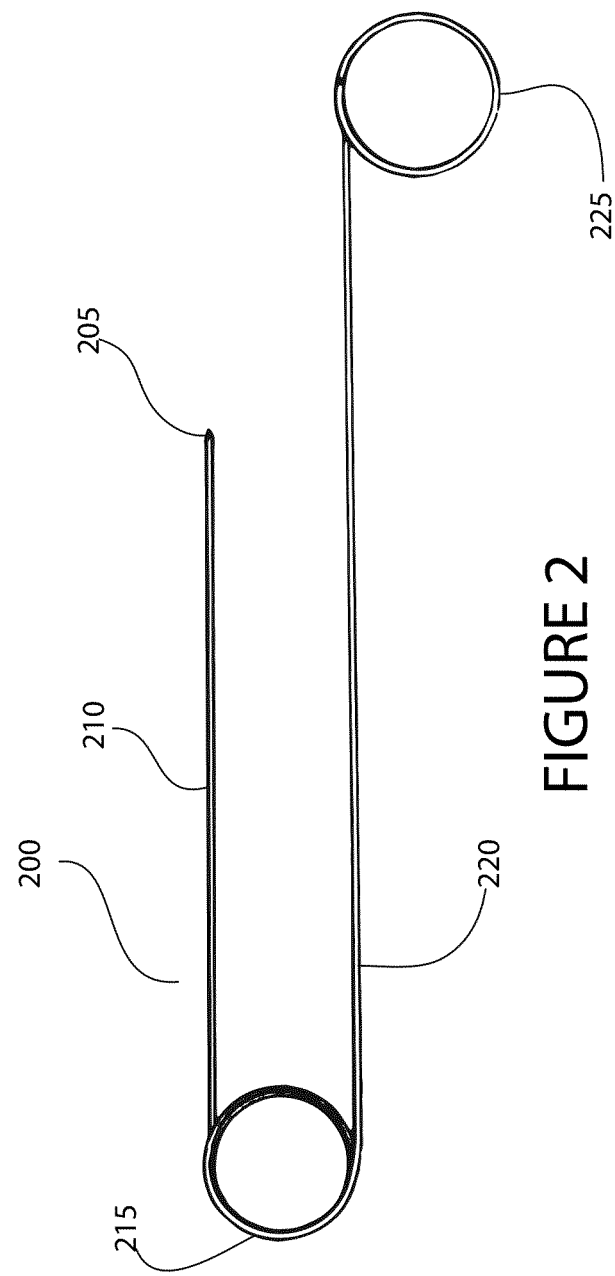
FIG. 2 conceptually illustrates an exemplary upside down weighted barbless hook with formed rings according to principles of the invention.

With reference to FIGS. 1 and 2, two embodiments of an exemplary weighted barbless hook according to principles of the invention are shown. In one embodiment the rings (i.e., eyelets) are welded to the hook body, while in the other embodiment the rings are integrally formed by bending the stock.

In FIG. 1 an embodiment of the upside down barbless hook 100 that uses welded on metal prefabricated rings 120, 130. Any kind of metal round stock and rings can be used, but since the invention is used in salt water, it is preferable to use corrosion resistant metal, although it is not necessary. The metal round stock is cut to length. One end is sharpened to a pointed tip 105. After the end is sharpened, the metal round stock is placed in a bender and bent to produce a "U" shape with a bend (i.e., bight) 115. Although the sides of the "U" can be any length, it facilitates the use of the invention if the side are not the same length. In particular, the shank 125 is preferably longer than the neck 110. While the neck 110 and shank 125 are shown to be substantially parallel, they may be slightly divergent or convergent without departing from the scope of the invention. A prefabricated metal ring 120 is welded on the outside of the "U" (convex side of the bend 115) to be used as an eyelet for attaching a retrieval line. While a retrevial line could be attached directly to the bend 115, eliminating the ring, the ring 120 prevents the retrieval line from slipping off. Another prefabricated ring 130 is welded to the remaining unsharpened end (i.e., to the free end of the shank 125) for attaching a weight. The use of the ring 130 for the weight allows for interchangable weights to be used.

In the embodiment illustrated in FIG. 2, the rings 215, 225 of the exemplary upside down barbless hook 200 are integrally formed during the bending process. The metal round stock is cut to length and one end is sharpened to a tip 205. The sharpened round stock is placed in a bender. A neck 210 extends from the tip 205 to a retrieval line ring 215. The stock is bent until the ring 215 is formed. A shank 220 extends from the retrieval line ring 215. The neck 210 and shank 220 form a "U" shape. This ring 215 is for attaching the retrieval line. The unsharpened free end of the round stock adjacent to the shank is placed in a bender and bent until a ring 225 is formed for attaching a weight. A tack weld may close the ring 225 preventing a weight from coming off. The tip 205 being located between the centers of the retrieval line ring 215 and weight attaching ring 225 along a longitudinal axis of the shank. The neck 210 and shank 220 extend tangentially from an outer periphery of the retrieval line ring 215.

Figure 3:
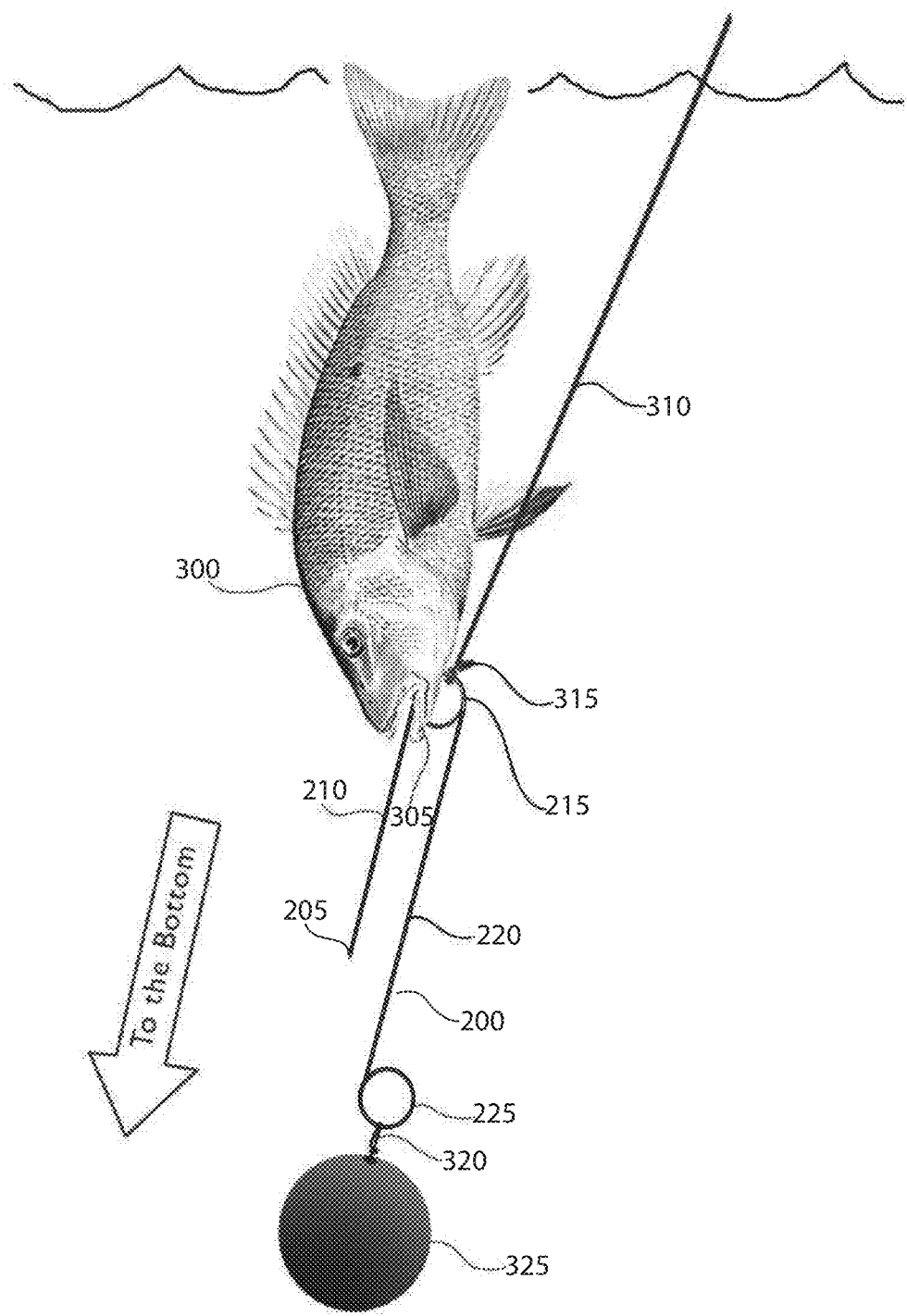
FIG. 3 conceptually illustrates a fish suffering from barotrauma descending on an exemplary upside down weighted barbless hook according to principles of the invention.

FIG. 3 illustrates a fish 300 suffering from barotrauma. The sharpened end 205 has been inserted through the thin skin 305 that is under the fish's chin/mouth, exiting out the fish's mouth being careful not to damage any protruding portion of the fish's stomach. A weight 325 has been attached to the ring 225 on the open end of the hook. The weight may be attached with a spring clip 320 or other suitable attachment. A retrieval line 310 is attached to the retrieval line ring 215. The line 310 may be attached directly to the ring with an appropriate knot 315. Alternatively, the line 310 may be coupled via a leader or spring clip. When the fish 300 reaches a desired depth, the line 310 is stopped and the fish will slide off, released to return to its habitat unharmed. The hook 200 is then pulled back to the surface to be used again when needed.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An upside down descending hook comprising a tip, said tip being pointed, an elongated neck extending from the pointed tip to a bend, an elongated shank having a first end and an opposite second end defining a longitudinal axis of the elongated shank therebetween, the first end of the shank leading from the bend, the shank, neck and bend forming a generally U-shaped structure with the shank and neck being substantially parallel, a weight attaching ring attached to the second end of the shank, and a line retrieval ring attached to the bend, the weight attaching ring defining the bottom of the upside down descending hook, the line retrieval ring defining the top of the upside down descending hook, the tip being located along the longitudinal axis of the shank so as to be between centers of the line retrieval ring and the weight attaching ring, the line retrieval ring located between the neck and shank, the weight attaching ring and line retrieval ring being located on opposing sides of the longitudinal axis of the shank, and the neck and shank extend tangentially from an outer periphery of the line retrieval ring.

2. The upside down descending hook of claim 1, wherein the weight attaching ring is welded to the shank.

3. The upside down descending hook of claim 1, wherein the line retrieval ring is welded to the bend.

4. The upside down descending hook of claim 1, wherein the weight attaching ring is integrally formed with the shank by bending.

5. The upside down descending hook of claim 1, wherein the line retrieval ring is integrally formed with the neck and shank by bending and comprises the bend.

6. The upside down descending hook of claim 1, said neck and shank being parallel.

7. The upside down descending hook of claim 1, the tip being barbless.

8. The upside down descending hook of claim 1, the shank being longer than the neck.

9. The upside down descending hook of claim 1 comprised of a metal.

10. The upside down descending hook of claim 1 comprised of a corrosion resistant metal.

11. An upside down descending hook comprising a pointed barbless tip, an elongated neck extending from the pointed barbless tip to a bend, an elongated shank having a first end and an opposite second end defining a longitudinal axis of the elongated shank therebetween, the first end of the shank leading from the bend, the shank, neck and bend forming a generally U-shaped structure with the shank and neck being substantially parallel, a weight attaching ring attached to the second end of the shank, and a line retrieval ring attached to the bend, the weight attaching ring defining the bottom of the upside down descending hook, the line retrieval ring defining the top of the upside down descending hook, the tip being located along the longitudinal axis of the shank so as to be between centers of the line retrieval ring and the weight attaching ring, the neck and shank extending tangentially from an outer periphery of the line retrieval ring, a weight coupled to the weight attaching ring, and a line coupled to the line retrieval ring.

12. The upside down descending hook of claim 11, the shank being longer than the neck.

13. The upside down descending hook of claim 11, the weight coupled to the weight attaching ring having sufficient mass to descend a fish.

14. The upside down descending hook of claim 11, the line being coupled to the line retrieval ring by a coupling from the group consisting of a leader and spring clip.

15. The upside down descending hook of claim 11 comprised of a corrosion resistant metal.

16. A metal upside down descending hook comprising a pointed barbless tip, an elongated neck extending from the pointed barbless tip to a bend, an integrally formed line retrieval ring at the bend, an elongated shank having a first end and an opposite second end, the first end of the shank leading from the line retrieval ring, the shank, neck and bend forming a generally U-shaped structure with the shank and neck being substantially parallel, a weight attaching ring integrally formed at the second end of the shank, the neck and shank extend tangentially from an outer periphery of the line retrieval ring, the weight attaching ring defining the bottom of the upside down descending hook, and the line retrieval ring defining the top of the upside down descending hook, a weight coupled to the weight attaching ring, a line coupled to the line retrieval ring, and the neck extending through skin of a mouth of a live fish.

17. The upside down descending hook of claim 6, the shank being longer than the neck.

18. The upside down descending hook of claim 6, the weight coupled to the weight attaching ring having sufficient mass to descend a fish.

19. The upside down descending hook of claim 6, the line coupled to the line retrieval ring by a coupling from the group consisting of a leader and spring clip.

20. The upside down descending hook of claim 6, the weight attaching ring being welded shut.

\* \* \* \* \*